(12) United States Patent
L'hereec et al.

(10) Patent No.: US 11,788,870 B2
(45) Date of Patent: Oct. 17, 2023

(54) TECHNIQUE FOR TRANSMITTING A MEASUREMENT TAKEN BY A SENSOR

(71) Applicant: ORANGE, Issy les Moulineaux (FR)

(72) Inventors: Kévin L'hereec, Chatillon (FR); Fano Ramparany, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 137 days.

(21) Appl. No.: 17/117,717

(22) Filed: Dec. 10, 2020

(65) Prior Publication Data
US 2021/0180999 A1    Jun. 17, 2021

(30) Foreign Application Priority Data

Dec. 12, 2019  (FR) ...................................... 1914300

(51) Int. Cl.
*G01D 9/00*    (2006.01)
*H04Q 9/00*    (2006.01)

(52) U.S. Cl.
CPC ................. *G01D 9/00* (2013.01); *H04Q 9/00* (2013.01); *H04Q 2209/82* (2013.01)

(58) Field of Classification Search
CPC ........ G01D 9/00; H04Q 9/00; H04Q 2209/82; H04L 1/0036
See application file for complete search history.

(56) References Cited

U.S. PATENT DOCUMENTS

| 7,062,405 | B2 | 6/2006 | Voelkel | |
|---|---|---|---|---|
| 2004/0133387 | A1* | 7/2004 | Volkel | G05B 21/02 702/177 |

| 2006/0092894 | A1* | 5/2006 | Amano | H04W 28/18 370/349 |

(Continued)

FOREIGN PATENT DOCUMENTS

| JP | 2008052415 A | * | 3/2008 | ............. G08C 17/00 |
| JP | 2008052415 A | | 3/2008 | |
| WO | 03007099 A1 | | 1/2003 | |

OTHER PUBLICATIONS

English translation of the French Search Report and Written Opinion dated Aug. 4, 2020 for corresponding French Application No. 1914300, filed on Dec. 12, 2019.

*Primary Examiner* — Michael J Dalbo
*Assistant Examiner* — Kaleria Knox
(74) *Attorney, Agent, or Firm* — David D. Brush; Westman, Champlin & Koehler, P.A.

(57) ABSTRACT

A method for transmitting a measurement taken by a sensor at a current measurement instant, a measurement instant and a measurement forming a measurement point. The method includes: determining a threshold on the basis of measurement points that temporally precede the current measurement point in a collection window; when a slope of a straight line that runs through the current measurement point and the measurement point that immediately precedes it is higher than the threshold, transmitting the measurement upon expiry of a waiting time that corresponds to the minimum time interval between two successive measurement instants in the collection window; when the slope is lower than the threshold, transmitting the measurement upon expiry of a waiting time that corresponds to the maximum time interval between two successive measurement instants in the collection window.

4 Claims, 2 Drawing Sheets

(56) References Cited

U.S. PATENT DOCUMENTS

| | | | |
|---|---|---|---|
| 2009/0024231 A1* | 1/2009 | Ji | H04L 1/0036 700/67 |
| 2013/0144562 A1* | 6/2013 | Ohmae | G06F 17/00 702/189 |
| 2019/0102840 A1* | 4/2019 | Perl | G06Q 40/08 |

* cited by examiner

TECHNIQUE FOR TRANSMITTING A MEASUREMENT TAKEN BY A SENSOR

FIELD OF THE DISCLOSURE

The invention relates to the general field of telecommunications.

The invention more specifically relates to a technique for transmitting a measurement taken by a sensor.

BACKGROUND OF THE DISCLOSURE

In the field of meteorology, sensors allow a physical quantity to be measured. They are calibrated so as to send a measured value on the basis of fixed rules. By way of illustration, according to a first method, the measured value or measurement is sent when a variation between this measurement and the previous measurement that is higher than a threshold is detected. This threshold, which is known as the "detection threshold" or "variation threshold", is configured by default in the factory or by an administrator of the sensor. However, a remote user may question the reliability of the sensor. Indeed, if there is little variation in the measured physical quantity, the last measurement may be relatively old. The user may then wonder whether a measurement has been lost. Still by way of illustration, according to a second method, the measurement is sent periodically, for example every fifteen minutes. This period, which is known as the "measurement interval", is configured by default in the factory or by an administrator of the sensor. This measurement interval may be unsuitable for the physical quantity under observation. For example, the measurements may be identical even though the physical quantity has changed significantly in the intervening time. It is also possible to combine these two methods in order to transmit a measurement on the basis of a variation threshold and a measurement interval. It will be understood that this combination of the two methods may have the drawbacks described above. The variation threshold and the measurement interval may be poorly calibrated by the operator. Thus, a variation threshold that is too low and a measurement interval that is too short would trigger the transmission of measurements too frequently. This impairs the autonomy of the sensor, in particular when it is battery-operated. A variation threshold that is too high and a measurement interval that is too long result in a lack of confidence by the user in the reliability of the sensor.

SUMMARY

One of the aims of the invention is to remedy inadequacies/drawbacks of the prior art and/or to afford improvements thereto.

According to a first aspect, a subject of the invention is a method for transmitting a measurement taken by a sensor at a current measurement instant, a measurement instant and a measurement forming a measurement point. This method comprises:
  determining a threshold on the basis of measurement points that temporally precede the current measurement point in a collection window;
  when a slope of a straight line that runs through the current measurement point and the measurement point that immediately precedes it is higher than the threshold, transmitting the measurement upon expiry of a waiting time that corresponds to the minimum time interval between two successive measurement instants in the collection window;
  when said slope is lower than the threshold, transmitting the measurement upon expiry of a waiting time that corresponds to the maximum time interval between two successive measurement instants in the collection window.

The proposed technique thus allows the measurements to be transmitted at the time when they will make it possible to ensure correct operation of the sensor. The threshold and the measurement interval take into account the previously taken measurements. The proposed technique adjusts a transmission threshold and a measurement interval on the basis of a plurality of previous measurements, and thus on the basis of the measured physical quantity. This allows a user to be assured that the sensor is operating correctly (by ensuring that the measurements are not too old) by sensing significant variations in the physical quantity while at the same time ensuring the autonomy of the sensor. The autonomy of the sensor is preserved since the measurements are transmitted in an optimized manner. The transmission of the measurement does not take place if this measurement is of no interest to the user of the sensor.

About ten previous measurements may be taken into account when determining the threshold and the interval between two measurements. The collection window is a sliding window that is updated on each new measurement.

By way of illustration, when two sensors are measuring light intensity, but one of the two is placed on a veranda (measurement of the light intensity coming from outside) and the second one is placed in a room inside a house (measurement of the light intensity indoors), it will be understood that the same threshold cannot be used for both sensors. It is thus relatively burdensome for the user to configure the thresholds for each of the sensors. With the proposed technique, the threshold for each sensor will adjust itself on the basis of the variations observed in the past measurements in the collection window. The proposed method thus allows the configuration of the sensors in their environment to be simplified.

The various embodiments or implementation features mentioned below may be added, independently or in combination with one another, to the method for transmitting a measurement taken by a sensor as defined above.

In one particular embodiment, the determined threshold corresponds to the highest of the slopes between two successive measurement points in the collection window.

This makes it possible to adjust the threshold on the basis of the variations observed over the collection window, in particular on the basis of the variability of the physical quantity.

In one particular embodiment, when a new measurement is taken by the sensor, the waiting time associated with the previous measurement not having expired, the method is implemented once again, and the waiting time associated with the new measurement takes into account the waiting time associated with the previous measurement that was not completed.

This makes it possible to readjust the transmission interval on the basis of a new measurement.

According to a second aspect, the invention relates to a sensor, which is configured to take measurements at measurement instants. This sensor comprises a module for controlling the transmission of a measurement, which is configured to:

determine a threshold on the basis of measurement points that temporally precede a current measurement point in a collection window, a measurement instant and a measurement forming a measurement point;

wait for a waiting time, said waiting time corresponding to the minimum time interval between two successive measurement instants in the collection window when a slope of a straight line that runs through the current measurement point and the measurement point that immediately precedes it is higher than the threshold, or said waiting time corresponding to the maximum time interval between two successive measurement instants in the collection window when this slope is lower than the threshold;

command the transmission of the measurement via a network interface when the waiting time has elapsed.

The advantages outlined for the method for transmitting a measurement taken by a sensor according to the first aspect can be transposed directly to a sensor.

This sensor may of course include, in structural terms, the various features relating to the method for transmitting a measurement taken by a sensor as described above, which features may be combined or taken separately.

According to a third aspect, the invention relates to a program for a sensor, which comprises program code instructions that are intended to command the execution of the steps of the method for transmitting a measurement taken by a sensor described above, which are carried out by a sensor, when this program is executed by this sensor, and a recording medium, which can be read by a sensor and on which a program for a sensor is recorded.

The advantages outlined for the method for transmitting a measurement taken by a sensor according to the first aspect can be transposed directly to the program for a sensor and to the recording medium.

BRIEF DESCRIPTION OF THE DRAWINGS

The technique for transmitting a measurement taken by a sensor will be better understood with the aid of the following description of particular embodiments, with reference to the appended drawings, in which.

DETAILED DESCRIPTION OF ILLUSTRATIVE EMBODIMENTS

Figure 1:
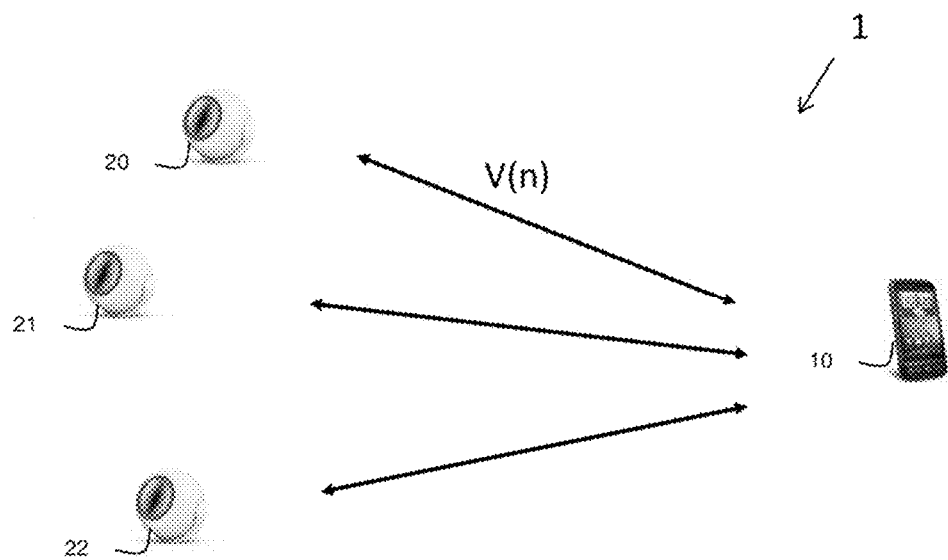
FIG. 1 depicts a system in which the method for transmitting a measurement taken by a sensor is implemented in one particular embodiment.

FIG. 1 depicts a system 1 in which the method for transmitting a measurement taken by a sensor is implemented in one particular embodiment. This system 1 comprises:

a plurality of sensors 20, 21, 22, which are configured to take a measurement V(n) of a given physical quantity;

a receiving device 10, which is configured to receive a measurement of a physical quantity taken by the sensors.

The sensors 20-22 are for example configured to take a light intensity measurement. As depicted in FIG. 1, the sensors 20-22 measure the same physical quantity. No limitation is associated with this depiction, the sensors being able to be of a different type and to measure distinct physical quantities. The sensor may have a variety of fields of application such as home automation, aerospace or meteorology in accordance with constraints in terms of energy and/or high reliability. In one particular embodiment, the sensors 20-22 are autonomous, i.e. battery-powered, sensors. Optimizing the measurement transmissions thus allows battery power to be saved.

In one particular embodiment, the sensors 20-22 communicate with the receiving device 10 by means of a wired communication protocol, for example UART (for "Universal Asynchronous Receiver-Transmitter"), SPI (for "Serial Peripheral Interface"), I²C (for "Inter-Integrated Circuit"), etc. In another particular embodiment, the sensors 20-22 communicate with the receiving device 10 by means of a wireless communication protocol, for example Wi-Fi, Z-Wave, Zigbee, LoRa (for "Long Range"), etc. It goes without saying that these various communication protocols may coexist.

The method for transmitting a measurement V(n) taken by a sensor at a current measurement instant T(n) will now be described in relation to FIGS. 2A, 2B and 2C in a system 1 as depicted in FIG. 1. The text that follows relates to the sensor 20.

Hereinafter, a measurement instant T(i) and a measurement V(i) form a measurement point P(i). A collection window comprises a number M of measurement points, including the measurement point P(n) at the current instant T(n). For example, M may take the value of ten. This collection window is a sliding window: it comprises the last M measurement points.

Figure 2A:
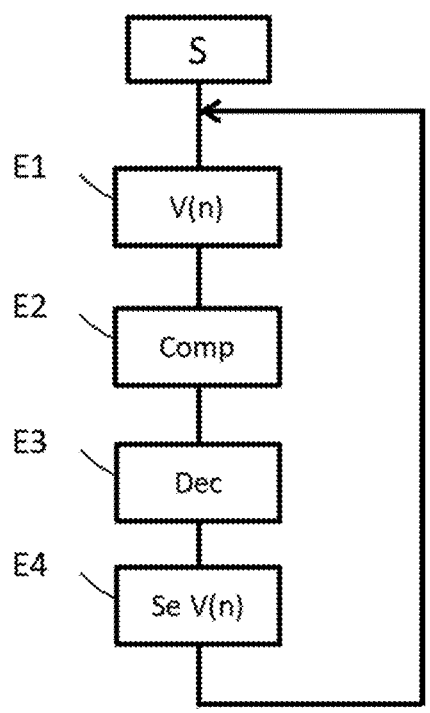
FIG. 2A illustrates steps of a method for transmitting a measurement taken by a sensor according to one particular embodiment.
Figure 2B:
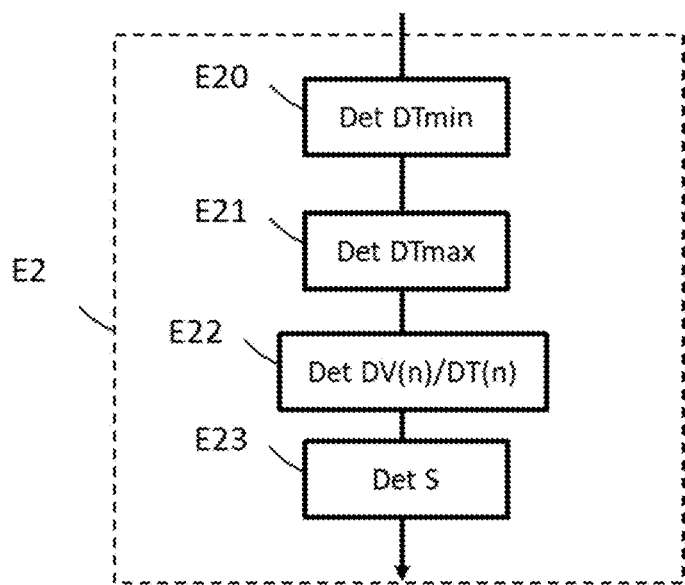
FIG. 2B illustrates one of the steps of the transmission method according to one particular embodiment.
Figure 2C:
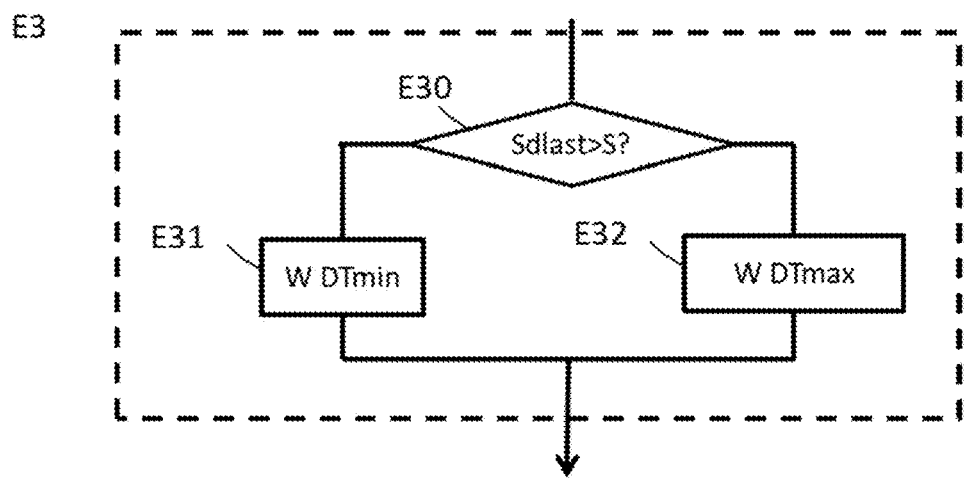
FIG. 2C illustrates one of the steps of the transmission method according to one particular embodiment.

Steps of the method for transmitting a measurement taken by a sensor 20 are described in relation to FIG. 2A according to one particular embodiment. In a step E1, the sensor 20 takes the measurement V(n) at a current instant T(n). This measurement point P(n) is added to the set of the M measurement points that are grouped together in the collection window, the oldest measurement point being removed from this collection window. Thus, the collection window comprises the current measurement point and the measurement points that temporally precede the current measurement point.

In a step E2, the sensor 20 determines a threshold S on the basis of the measurement points included in the collection window. Thus, every time a new measurement is taken, the latter is taken into account to adjust the threshold S.

In a step E3, the sensor 20 compares a slope of a straight line that runs through the current measurement point P(n) and the measurement point P(n−1) that immediately precedes it with the threshold S.

On the basis of the result of this comparison, the sensor 20 waits for a reference time, which is determined on the basis of the time intervals between two successive measurement instants in the collection window.

In a step E4, the sensor 20 transmits the measurement that has been taken to the receiving device 10.

The step E2 of determining the threshold S will be described more precisely in relation to FIG. 2B.

The time that elapses between the measurement taken at the instant T(i−1) and the instant T(i) is denoted by DT(i). DT(i) represents the time that elapses between a measurement and the measurement taken immediately prior to it.

The set of time intervals over the collection window is denoted by $ST(n,M)=\{DT(i)\}$ for i between n−M+1 and n.

The variation between two successive measurements, i.e. between the measurement V(i) taken at the instant T(i) and the measurement V(i−1) taken at the instant T(i−1) is denoted by DV(i): $DV(i)=V(i)-V(i-1)$.

In a step E20, the sensor 20 determines the minimum time interval, denoted by DTmin, between two successive measurement instants in the collection window: $DTmin=\min(ST(n,M))$.

In a step E21, the sensor 20 determines the maximum time interval, denoted by DTmax, between two successive measurement instants in the collection window: $DTmax=\max(ST(n,M))$.

In a step E22, the sensor 20 calculates the slope SD(n) of a straight line that runs through the current measurement point P(n) and the measurement point P(n−1) that immediately precedes it: $SD(n)=DV(n)/DT(n)$. It is emphasized here that the slopes SD(i), for i ranging from n−M+1 to n−1, have already been calculated in a previous iteration of step E22 (for the measurement point P(n−1)). The set of these slopes is denoted as $SD(n,M)=\{Dv(i)/DT(i)\}$, for i ranging from n−M+1 to n.

In a step E23, the sensor 20 determines the highest of the slopes SDmax from the set SD(n,M), i.e. the highest of the slopes between two successive measurement points in the collection window, and assigns this value SDmax to the threshold S. It is thus observed that the threshold S is calculated on the basis of the measurement points included in the collection window and may vary on each new measurement. The threshold S thus takes into account the variability of the measured physical quantity.

The step E3 of making a transmission decision on the basis of the threshold S will be described more precisely in relation to FIG. 2C.

In a step E30, the slope SD(n) is compared with the threshold S. When the slope SD(n) is higher than the threshold, a waiting time DTmin that corresponds to the minimum time interval between two successive measurement instants in the collection window is triggered in a step E31. When the slope SD(n) is lower than or equal to the threshold S, a waiting time DTmax that corresponds to the maximum time interval between two successive measurement instants in the collection window is triggered in a step E32. Upon expiry of this waiting time, the sensor 20 carries out the transmission step E4. This variable waiting time makes it possible to adjust the transmission on the basis of the variability of the measured physical quantity while making it possible for the user not to question the reliability of the measurements taken by the sensor.

In one particular embodiment, when a new measurement V(n+1) is taken by the sensor 20 in step E1 even though the waiting time associated with the previous measurement has not expired, steps E2 and E3 are carried out once again with the new measurement point P(n+1), the latter becoming the current measurement point, in order to determine new DTmin, DTmax and S values. Taking this new measurement point P(n+1) into account may then result in the waiting time being changed, i.e. shortened or extended. The waiting time associated with the new measurement thus takes into account the waiting time associated with the previous measurement that was not completed. The new measurement V(n+1) is then transmitted in step E4, once the waiting time has expired.

Figure 3:
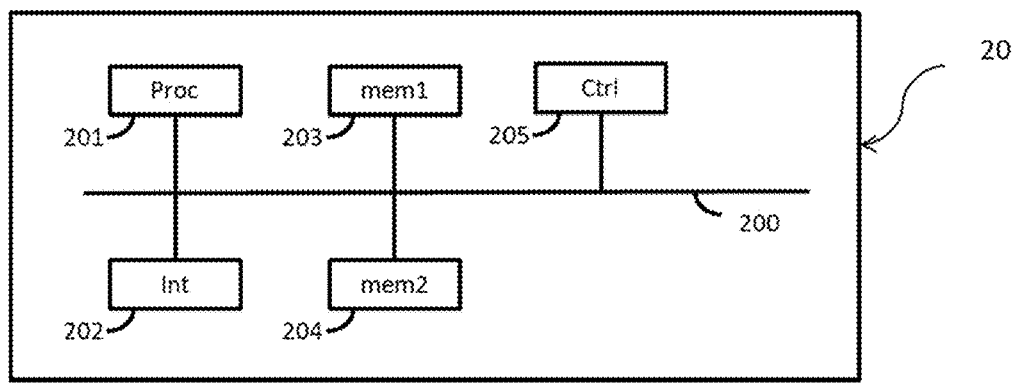
FIG. 3 depicts a sensor in one particular embodiment.

FIG. 3 schematically illustrates a sensor 20 in one particular embodiment.

The sensor 20 comprises, in particular:
a hardware processor 201 for executing code instructions of software modules;
a memory zone 203, which is configured to store a program that comprises code instructions for carrying out steps of the method for transmitting a measurement;
a storage memory 204, which is configured to store data that are used during the implementation of the method for transmitting a measurement, such as parameters used for calculations performed by the processor 201, intermediate data relating to calculations performed by the processor 201, etc.;
a network interface 202;
a module for controlling the transmission of a measurement 205,
which are connected to one another via a bus 200.

Of course, the elements that make up the sensor may be connected by means of a connection other than a bus.

The processor 201 controls the operations of the sensor. The memory zone 203 stores at least one item of computer program code which, when it is executed by the processor 201, carries out the various functions of the sensor. The processor 201 may be formed by any known and appropriate piece of hardware or software, or by a combination of hardware and software. For example, the processor 201 may be formed by a dedicated piece of hardware such as a processing circuit, or by a programmable processing unit such as a central processing unit which executes a program stored in a memory of said processor.

The memory zone 203 may be formed by any appropriate means capable of storing the program in a computer-readable manner. Examples of a memory zone 203 comprise computer-readable non-transient storage media such as semiconductor memory devices, and magnetic, optical or magneto-optical recording media loaded into a read and write unit. The program causes the processor 201 to execute a method for transmitting a measurement according to one particular embodiment.

A network interface 202 provides a connection between the sensor 20 and a receiving device 10 via a communication network based on an underlying access network. The network interface 202 may, depending on the nature thereof, provide a wired or wireless connection.

The module for controlling the transmission of a measurement 205 is configured to:
determine a threshold on the basis of measurement points that temporally precede the current measurement point in a collection window,
wait for a waiting time, this waiting time corresponding to the minimum time interval between two successive measurement instants in the collection window when a slope of a straight line that runs through the current measurement point and the measurement point that immediately precedes it is higher than the threshold, and this waiting time corresponding to the maximum time interval between two successive measurement instants in the collection window when this slope is lower than the threshold,
command the transmission of the measurement via the network interface 202 once the waiting time has elapsed.

The technique for transmitting a measurement is implemented by means of software and/or hardware components. In this context, the term "module" may correspond, in this document, either to a software component or to a hardware component, or to a set of hardware and/or software components capable of carrying out a function or a set of functions in accordance with what has been described above for the module in question.

A software component corresponds to one or more computer programs, one or more subroutines of a program, or more generally any element of a program or of a piece of software. A software component of this kind is stored in memory and then loaded and executed by a data processor of a physical entity and is capable of accessing the hardware resources of this physical entity (memories, recording media, communication buses, electronic input/output cards, user interfaces, etc.).

In the same way, a hardware component corresponds to any element of a hardware assembly. It may be a hardware component that is programmable or that is not programmable, with or without an integrated processor for executing software. It is, for example, an integrated circuit, a chip card, an electronic card for executing firmware, etc.

In one particular embodiment, the sensor 20 is configured to carry out steps of the method for transmitting a measurement, which are carried out by a sensor. Software modules are preferably concerned, said modules comprising software instructions for causing the execution of the steps (or actions) of the method for transmitting a measurement that has been described above, which are carried out by a sensor.

An embodiment of the invention thus also relates to:
a program for a sensor, which comprises program code instructions that are intended to command the execution of the steps (or the actions) of the method for transmitting a measurement that has been described above, when said program is executed by said sensor;
a recording medium, which can be read by a sensor and on which the program for a sensor is recorded.

The software modules may be stored in or transmitted by a data storage medium. This may be a hardware storage medium, for example a CD-ROM, a floppy disk or a hard disk, or else a transmission medium such as an electrical, optical or radio signal, or a telecommunication network.

An embodiment of the invention thus also relates to a sensor, which is configured to transmit a measurement and comprises a processor, which is configured to:
determine a threshold on the basis of measurement points that temporally precede the current measurement point in a collection window;
when a slope of a straight line that runs through the current measurement point and the measurement point that immediately precedes it is higher than the threshold, transmit the measurement upon expiry of a waiting time that corresponds to the minimum time interval between two successive measurement instants in the collection window;
when said slope is lower than the threshold, transmit the measurement upon expiry of a waiting time that corresponds to the maximum time interval between two successive measurement instants in the collection window.

Although the present disclosure has been described with reference to one or more examples, workers skilled in the art will recognize that changes may be made in form and detail without departing from the scope of the disclosure and/or the appended claims.

The invention claimed is:

1. A method performed by a sensor and comprising:
taking a plurality of measurements of a physical quantity at respective measurement instants, each of the plurality of measurements and respective measurement instants forming a respective one of a plurality of measurement points over time; and
for a current measurement point of the plurality of measurement points:
determining a threshold on the basis of a plurality of the measurement points that temporally precede the current measurement point in a collection window;
determining whether a slope of a straight line that runs through the current measurement point and the measurement point that immediately precedes the current measurement point in time in the collection window is higher than the threshold or lower than the threshold, the threshold corresponding to a highest of slopes between two successive measurement points among the plurality of measurement points in the collection window that precede the current measurement point;
determining a waiting time for transmitting the measurement corresponding to the current measurement point, wherein:
if the slope is higher than the threshold, the waiting time corresponds to a minimum time interval between two successive measurement instants in the collection window;
else, if said slope is lower than the threshold, the waiting time corresponds to a maximum time interval between two successive measurement instants in the collection window;
waiting the waiting time; and
transmitting the measurement corresponding to the current measurement point via a network interface upon expiry of the waiting time.

2. The method as claimed in claim 1, wherein, in response to a new measurement being taken by the sensor at a new measurement instant, the waiting time associated with the previous measurement point not having expired, the method is implemented once again, and the waiting time associated with the new measurement takes into account the waiting time associated with the previous measurement that has not completed.

3. A sensor comprising:
a processor; and
a non-transitory computer-readable medium comprising instructions stored thereon, which when executed by the processor configure the sensor to:
take a plurality of measurements of a physical quantity at respective measurement instants by the sensor, each of the plurality of measurements and respective measurement instants forming a respective one of a plurality of measurement points over time; and
for a current measurement point of the plurality of measurement points:
determine a threshold on the basis of a plurality of the measurement points that temporally precede the current measurement point in a collection window;
determine whether a slope of a straight line that runs through the current measurement point and the measurement point that immediately precedes the current measurement point in time in the collection window is higher than the threshold or lower than the threshold, the threshold corresponding to a highest of slopes between two successive measurement points among the plurality of measurement points in the collection window that precede the current measurement point;
determine a waiting time for transmitting the measurement corresponding to the current measurement point, wherein:

said waiting time corresponds to a minimum time interval between two successive measurement instants in the collection window if the slope is higher than the threshold, else, said waiting time corresponds to a maximum time interval between two successive measurement instants in the collection window if the slope is lower than the threshold;

wait the waiting time; and transmit the measurement corresponding to the current measurement point via a network interface upon expiry of the waiting time.

4. A non-transitory computer-readable recording medium on which program code instructions are recorded, which when executed by a processor of a sensor configure the sensor to:

take a plurality of measurements of a physical quantity at respective measurement instants, each of the plurality of measurements and respective measurement instants forming a respective one of a plurality of measurement points over time; and for a current measurement point of the plurality of measurement points:

determine a threshold on the basis of a plurality of the measurement points that temporally precede the current measurement point in a collection window;

determine whether a slope of a straight line that runs through the current measurement point and the measurement point that immediately precedes the current measurement point in time in the collection window is higher than the threshold or lower than the threshold, the threshold corresponding to a highest of slopes between two successive measurement points among the plurality of measurement points in the collection window that precede the current measurement point;

determine a waiting time for transmitting the measurement corresponding to the current measurement point, wherein:

if the slope is higher than the threshold, the waiting time corresponds to a minimum time interval between two successive measurement instants in the collection window;

else, if said slope is lower than the threshold, the waiting time corresponds to a maximum time interval between two successive measurement instants in the collection window;

wait the waiting time; and transmit the measurement corresponding to the current measurement point via a network interface upon expiry of the waiting time.

* * * * *